(12) United States Patent
Minami et al.

(10) Patent No.: US 8,104,229 B2
(45) Date of Patent: Jan. 31, 2012

(54) GLASS RUN

(75) Inventors: Yukimura Minami, Aichi-ken (JP); Kazuo Ogawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 627 days.

(21) Appl. No.: 12/289,519

(22) Filed: Oct. 29, 2008

(65) Prior Publication Data
US 2009/0108625 A1    Apr. 30, 2009

(30) Foreign Application Priority Data
Oct. 30, 2007    (JP) ................ P2007-282037

(51) Int. Cl.
E06B 7/16    (2006.01)
(52) U.S. Cl. .................... 49/479.1; 49/441
(58) Field of Classification Search ........... 49/475.1, 49/479.1, 495.1, 440, 441
See application file for complete search history.

(56) References Cited

U.S. PATENT DOCUMENTS

| | | | |
|---|---|---|---|
| 5,319,883 A * | 6/1994 | Gueneau et al. | 49/489.1 |
| 6,240,677 B1 * | 6/2001 | Baumann | 49/479.1 |
| 6,493,992 B2 * | 12/2002 | Goto | 49/441 |
| 6,996,936 B1 * | 2/2006 | Maass | 49/479.1 |
| 7,275,782 B2 | 10/2007 | Morihara | |
| 7,581,354 B2 * | 9/2009 | Yamada | 49/479.1 |
| 7,650,718 B2 * | 1/2010 | Eguchi et al. | 49/479.1 |

FOREIGN PATENT DOCUMENTS

| | | |
|---|---|---|
| JP | 08-295134 | 11/1996 |
| JP | 2004-050881 | 2/2004 |
| JP | 2006-327415 | 12/2006 |

OTHER PUBLICATIONS

Chinese Office Action dated Feb. 5, 2010, with English translation.

* cited by examiner

*Primary Examiner* — Jerry Redman
(74) *Attorney, Agent, or Firm* — McGinn IP Law Group, PLLC (57) ABSTRACT

An automobile door is provided with a glass run that seals a peripheral part of a door glass which moves up and down. A garnish is mounted along a door frame on a vehicle-interior side thereof. The glass run includes an extension wall portion formed to extend from an end of a vehicle-interior side wall portion in a molded part of a corner portion thereof, and a catching portion that is formed in the vicinity of an inner peripheral side end part of the extension wall portion to extend to protrude into a vehicle-interior and that is caught on a folded portion of the garnish. The extension wall portion includes a deforming portion configured to be thinner than a general part of the extension wall portion.

11 Claims, 4 Drawing Sheets

// GLASS RUN

BACKGROUND OF THE INVENTION

1. Field of the Invention

The present invention relates to a glass run to be attached to a vehicle door.

2. Related Art

Generally, a vehicle door for an automobile or the like is provided with a glass run that seals a peripheral portion of a door glass which slides. The glass run has a substantially U-shaped cross-section main body and a pair of seal lips respectively extending from both side walls of the main body to an inner side thereof. The main body is fit into a mounting portion (e.g., a sash) provided on an inner peripheral side of a door frame. Further, vehicle-interior and vehicle-exterior surfaces of a peripheral edge portion of the door glass are sealed by the pair of seal lips.

Moreover, in a case where a corner portion of a door frame is formed into a right-angled shape or an acute-angled shape like a rear upper corner portion of a front door, and where an associated corner part of a door opening portion of a body is gently curved, there is a fear that a gap is formed between the glass run provided on the corner portion and a weatherstrip provided on the body, and that the quality of the appearance of a vehicle is degraded. Thus, a conventional glass run is constructed so that the aforementioned gap is covered with an extension wall part formed in a corner portion thereof to extend from a vehicle-interior side wall to an inner periphery thereof, and that the quality of the appearance is improved (see, e.g., JP-A-8-295134).

However, there is a fear that the extension wall part follows, e.g., a movement of the seal lip, which is caused by a sliding motion of the door glass, and that an end portion (inner peripheral side edge portion) of the extension wall part is floated up. In order to cope with this problem, a conventional glass run is constructed so that a catching portion is provided in the vicinity of an end portion of the extension wall part, and that the catching portion is caught on an interior member, such as a garnish, thereby preventing the end portion from being floated up (see, e. g., JP-A-2004-50881).

Further, when a glass run is molded, it is necessary that a mold (core) for forming an inner peripheral surface of each of a main body and a pair of seal lips is inserted into a molded portion for forming a corner portion of a glass run. Generally, a glass run is formed into a developed shape, in which both side walls of the main body portion are largely opened, to maintain the holding strength of the core. However, in a case where the main body is deformed so that both side walls thereof are narrowed when the glass run is attached to a sash, the aforementioned extension wall part, more specifically, there is a fear that an inner peripheral side edge portion thereof is deformed so as to undulate. Additionally, even in the case of providing the catching portion, as described in the aforementioned JP-A-2004-50881, it is difficult to prevent the deformation of the extension wall part. In some case, the deformation may cause disengagement of the catching portion from an interior member.

In order to cope with this problem, it is considered to suppress deformation of the extension wall portion by increasing the thickness thereof. However, in a case where the glass run is made by a thermoplastic resin material such as an olefinic thermoplastic elastomer (TPO), it is fear that a sink mark is formed on a vehicle-exterior side surface, i.e., a design surface of the extension wall portion due to characteristics of the material when the glass run is formed.

SUMMARY OF THE INVENTION

The invention is accomplished to solve the aforementioned problems. An object of the invention is to provide a glass run enabled to suppress deformation of an extension wall part at a corner portion of a glass run and to improve the quality of the appearance of a vehicle.

Hereinafter, means suitable for solving the aforementioned problems are described by itemizing. Incidentally, if necessary, characteristic operations and advantages are described in addition to the description of an associated one of such means.

Means 1: A glass run (hereunder referred to as a first glass run of the invention) mounted on a vehicle door having a door glass. An interior member is mounted along a vehicle-interior side portion of a door frame. The glass run is featured by comprising:

extruded portions formed corresponding to an upper side, a molded portion molded corresponding to a predetermined corner portion of the door frame, and front and rear vertical sides of the door frame. The glass run is featured in that the molded portion comprises:

a substantially U-shaped cross-section main body portion, attached to a mounting portion provided in an inner peripheral side of the door frame, including a base portion, and a vehicle-interior side wall portion and a vehicle-exterior side wall portion;

a vehicle-interior side seal lip and a vehicle-exterior side seal lip respectively extending from ends of the vehicle-interior side wall portion and the vehicle-exterior side wall portion to an inner side of the main body and sealing a space together with the door glass; and an extension wall portion formed to extend from an end of the vehicle-interior side wall portion to the inner peripheral side of the corner portion and to cover a vehicle-exterior side surface of the interior member. The glass run is featured also in that the extension wall portion comprises a deforming portion which has a thickness thinner than another part thickness thereof.

According to Means 1 (the first glass run of the invention), in the extension wall portion, the deforming portion is thinner than other general parts thereof. Thus, the deforming portion is low in stiffness and is liable to deform. Accordingly, when the glass run is attached to a mounting portion, the deforming portion follows the deformation of the main body and positively deforms. Thus, Means 1 can suppress a situation in which a deforming stress of the main body acts in an inner peripheral side end part of the extension wall portion, and in which the inner peripheral side end part of the extension wall portion is deformed. Consequently, the quality of the appearance of the glass run can be improved.

Further, when the glass run is attached to the mounting portion, the vehicle-interior side wall portion is tilted and deformed to the inner side (vehicle-exterior side) of the main body. However, the extension wall portion is not deformed completely synchronously with the vehicle-interior side wall portion. The extension wall portion is slightly tilted and deformed to the vehicle-interior side while an angle with respect to the vehicle-interior side wall portion is varied by deforming the deforming portion. Thus, Means 1 can suppress a situation in which the quality of the appearance can be degraded due to the fact that the extension wall portion is largely floated up from the interior member.

In addition, there is no necessity for increasing the thickness of the extension wall portion and enhancing the stiffness thereof in order to suppress the deformation of the inner peripheral side end part of the extension wall portion. Thus, Means 1 can avoid a situation in which, for example, in a case where the extension wall portion is constructed by a thermoplastic resin material, such as an olefinic thermoplastic elastomer, a sink mark is formed on the design surface of the extension wall portion. Accordingly, the number of options for selecting the material of the glass run is increased. Thus, a glass run having a desired characteristic can be obtained by selecting an appropriate material. Incidentally, in the case of employing a thermoplastic resin material as the material of the molded portion, a vulcanization process is unnecessary for manufacturing a glass run. Consequently, the productivity of the glass run can be enhanced.

Means 2: An embodiment (hereunder referred to as a second glass run of the invention) of the first glass run of the invention, which is featured in that a catching portion formed in the vicinity of an inner peripheral side end part of the extension wall portion to protrude into a vehicle-interior side, and to be caught on an end part of a corner portion of the interior member.

According to Means 2 (the second glass run of the invention), basically, advantages similar to those of the aforementioned Means 1 are fulfilled. Further, according to Means 2, the extension wall portion can more surely be prevented due to the presence of the catching portion from being floated up. Therefore, the quality of the appearance of the glass run can be more improved. Additionally, the extension wall portion can relatively smoothly be displaced (tilted and deformed) to the vehicle-interior side because of the presence of the deforming portion. In addition, Means 2 can suppress the deformation of the extension wall portion due to the displacement thereof. Thus, the deforming stress generated in the extension wall portion can be reduced by displacing the extension wall portion to the vehicle-interior side when the catching portion is caught on the interior member. Moreover, Means 2 can suppress a situation in which a stress acts in the catching portion in the vehicle exterior direction. Consequently, Means 2 can prevent occurrence of inconvenience that the catching portion is disengaged from the interior member.

Furthermore, Means 2 can suppress a situation in which when the catching portion is caught on the interior member, a stress displacing the extension wall portion to the vehicle-interior side acts in the main body portion and the seal lip. Accordingly, Means 2 can avoid a situation the main body portion and the seal lip are distorted in cross-section at the corner portion. Consequently, the glass run can easily and stably be attached to the interior member. Thus, the glass run can fulfill the functions thereof.

Means 3: An embodiment (hereunder referred to as a third glass run of the invention) of the first or second glass run of the invention, which is featured in that the deforming portion is constructed by forming a groove portion in the extension wall portion along a circumferential direction of the molded portion.

According to Means 3 (the third glass run of the invention), the thickness of a general part other than the deforming portion of the extension wall portion is increased. Consequently, the deforming portion is constructed by forming the groove portion in the extension wall portion to thereby set the extension wall portion to be thinner than the general part, instead of setting the deforming portion to be thinner than the general part. Accordingly, Means 3 can surely prevent inconvenience caused due to the fact that the extension wall portion is formed to be thick.

Means 4: An embodiment (hereunder referred to as a fourth glass run of the invention) of the third glass run of the invention, which is featured in that the groove portion is formed in a vehicle-interior side surface of the extension wall portion, which faces the interior member.

According to Means 4 (the fourth glass run of the invention), occurrence of a situation, in which the design of the glass run is degraded due to the fact that the groove portion is exposed on the appearance, can be prevented. Further, because the groove portion is formed in the vehicle-interior side surface of the extension wall portion, the extension wall portion can be more smoothly displaced (tilted and deformed) to the vehicle-interior side.

Means 5: An embodiment (hereunder referred to as a fifth glass run of the invention) of one of the first to fourth glass runs of the invention, which is featured in that the deforming portion is constructed to be thinner than the vehicle-interior side wall portion and the vehicle-interior side seal lip.

For example, in a case where the stiffness of the extension wall portion is higher than that of the vehicle-interior side wall portion, there is a fear that when a force directed to the vehicle-interior side is applied to the extension wall portion, the force acts on the vehicle-interior side wall portion, instead of the extension wall portion, and that the vehicle-interior side wall portion is bent. However, according to Means 5 (the fifth glass run of the invention), the deforming portion is constructed to be thinner than the vehicle-interior side wall portion and the vehicle-interior side seal lip. Thus, the stress generated at attaching of the glass run to the mounting portion surely acts in the deforming portion. Consequently, Means 5 can surely prevent occurrence of a situation in which such a stress acts in the vehicle-interior side wall portion and the vehicle-interior side seal lip and in which the vehicle-interior side wall portion and the vehicle-interior side seal lip are distorted in cross-section. Accordingly, Means 5 can more surely achieve the advantages that the glass run can easily and stably be attached to the mounting portion, and that the glass run can fulfill the functions thereof.

Means 6: An embodiment (hereunder referred to as a sixth glass run of the invention) of one of the first to fifth glass runs of the invention, which is featured in that the deforming portion is formed a boundary portion between the vehicle-interior side seal lip and a part of the extension wall portion or in the vicinity of the boundary portion.

According to Means 6 (the sixth glass run of the invention), when the glass run is attached to the mounting portion, both side wall portions can smoothly be narrowed. Accordingly, the extension wall portion is difficult to stretch. Consequently, Means 6 can prevent occurrence of a situation in which the main body portion (particularly, the vehicle-interior side wall portion) and the vehicle-interior side seal lip are distorted in cross-section and in which the attachability of the glass run is reduced. Furthermore, the extension wall portion (the general part) can be suppressed from being deformed from the base thereof. Thus, Means 6 can more effectively fulfill the advantage in that the deformation of the extension wall portion is suppressed.

Means 7: An embodiment (hereunder referred to as a seventh glass run of the invention) of one of the first to sixth glass runs of the invention, which is featured in that the deforming portion is continuously formed over the entire circumferential region of the extension wall portion.

According to Means 7 (the seventh glass run of the invention), the aforementioned advantages can be fulfilled over the entire circumferential region of the molded portion. Additionally, the deforming portion is formed in a large range in the circumferential direction of the extension wall portion as one continuous element. Consequently, the deforming portion can more smoothly follow the deformation of the extension wall portion. That is, even in a case where when the glass run is attached to the mounting portion, the magnitude of the stress acting in the extension portion varies with parts of the extension portion, the deforming portion absorbs the stress applied wholly to the extension portion in a wide range. Accordingly, Means 7 can prevent occurrence of a situation in which only the deforming portion corresponding to a predetermined part of the extension wall portion is extremely largely deformed. Consequently, the quality of the appearance can more surely be improved.

DETAILED DESCRIPTION OF THE PREFERRED EMBODIMENTS

Figure 1:
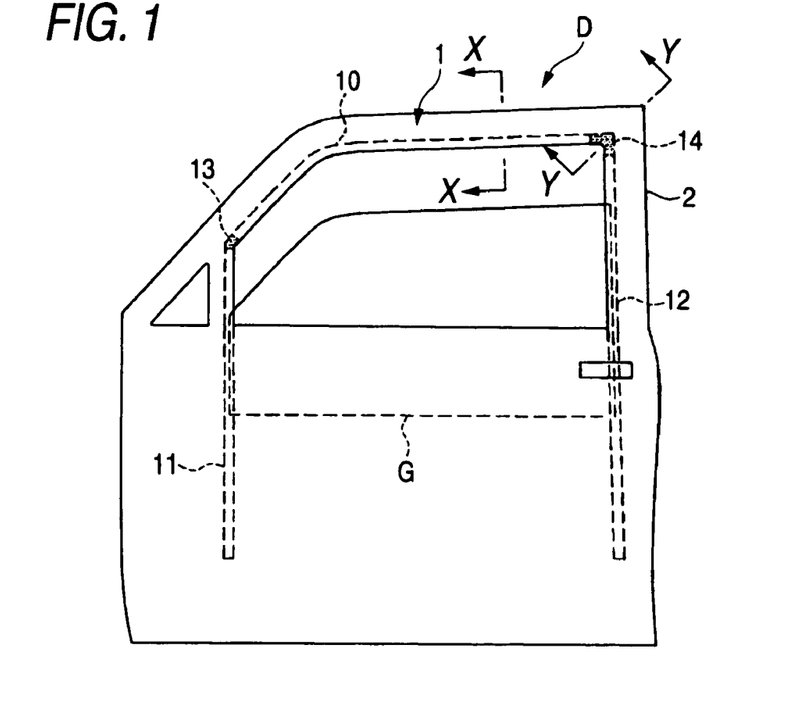
FIG. 1 is a front view illustrating an automobile door.

Hereinafter, an embodiment of the invention is described with reference to the accompanying drawings. As illustrated in FIG. 1, an automobile door D (front door as viewed in FIG. 1 (hereunder referred to simply as a "door")) serving as a vehicle door is provided with a glass run 1 which seals a peripheral portion of a door glass G that moves up and down.

Figure 4:
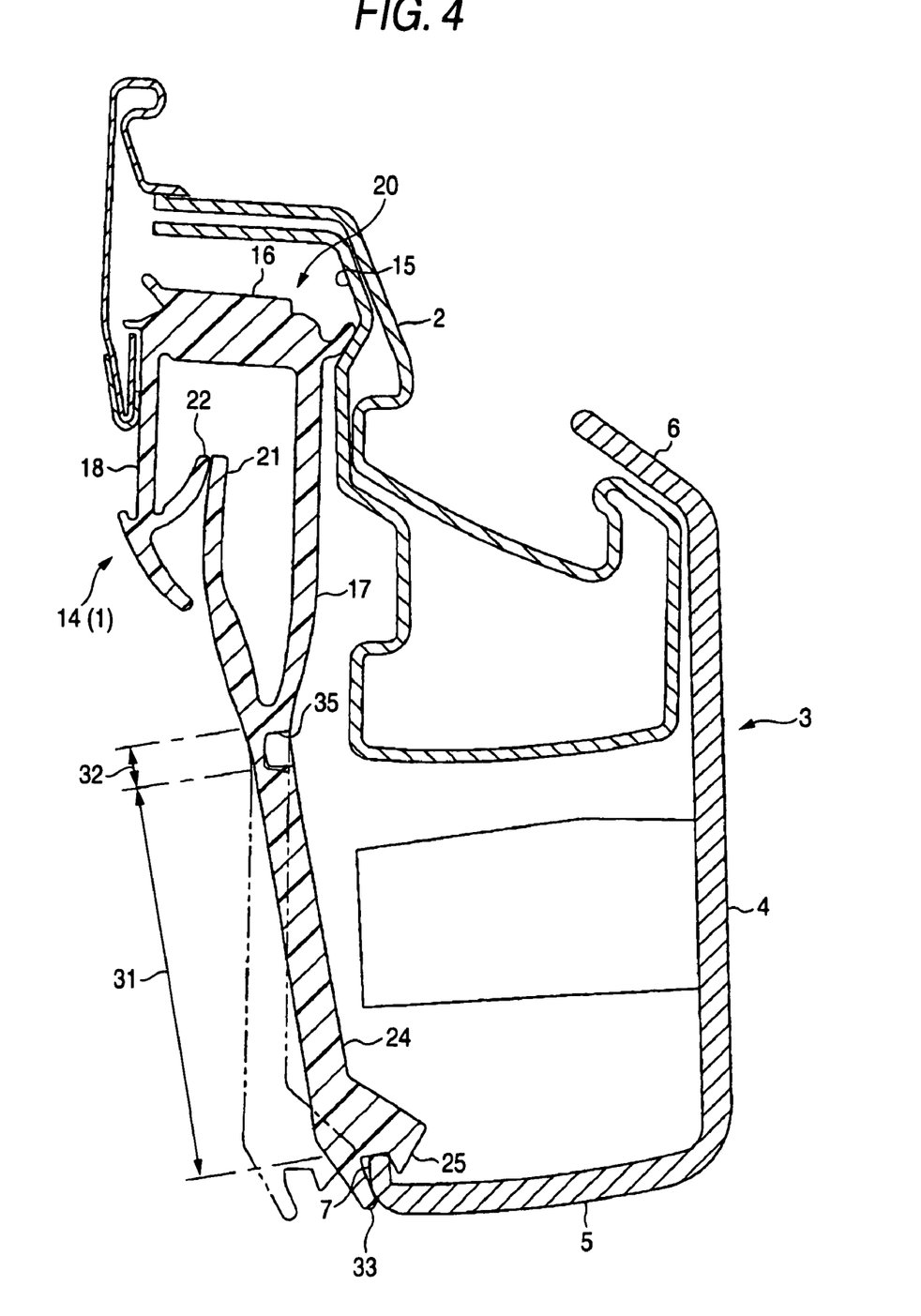
FIG. 4 is a dross-sectional view illustrating a molded part of the glass run in a state in which the glass run is attached to a sash, which is take on line Y-Y illustrated in FIG. 1.

Further, as illustrated in FIG. 4, a garnish 3 serving as an interior member is mounted along a door frame 2 on a vehicle-interior side of the door frame 2. Particularly, at least a part of the garnish 3 is provided at an inner peripheral position (in a lower part of FIG. 4) inner than the door frame at a rear upper corner portion of the door frame 2 so as to cover a peripheral end part of an automobile-body-side door opening portion. More specifically, at a part corresponding to the rear upper corner portion, the garnish 3 includes a side wall portion 4 provided substantially in parallel to the door glass G, an inner wall portion 5 extending from an inner peripheral side end part (the lower part of FIG. 4) of the corner portion of the side wall portion 4 to a vehicle-exterior side (a left side of FIG. 4), the outer portion 6 extending from an outer peripheral side end part (an upper part of FIG. 4) of the corner portion of the side wall portion 4 to the vehicle-exterior side, and a folded portion 7 formed by folding a vehicle-exterior side end part of the inner wall portion 5. Moreover, according to the present embodiment, an angle formed between the folded portion 7 and the inner wall portion 5 is set to be a substantially right angle. An angle formed between the outer wall portion 6 and the side wall portion 4 is set to be an obtuse angle. Additionally, the folded portion 7 is provided partly corresponding to a catching portion 25 of the glass run 1.

On the other hand, the glass run 1 is constructed by an olefinic thermoplastic elastomer (TPO). As illustrated in FIG. 1, the glass run 1 includes an extruded portion 10 corresponding to a top side portion, extruded portions 11 and 12 respectively corresponding to front and rear longitudinal side portions, and molded portions 13 and 14 (portions indicated by dotted patterns in FIG. 1) respectively connecting between the two extruded portions 10 and 11 and between the two extruded portions 10 and 12, as viewed in a longitudinal direction thereof. Each of the extruded portions 10 to 12 is formed by an extruder (not shown) substantially like a straight line (in an elongated manner). Furthermore, the molded portions 13 and 14 are connectedly molded by a molding apparatus (not shown) so as to connect each of pairs of the two extruded portions 10 and 11 and the two extruded portions 10 and 12 to each other at a predetermined angle.

Figure 2:
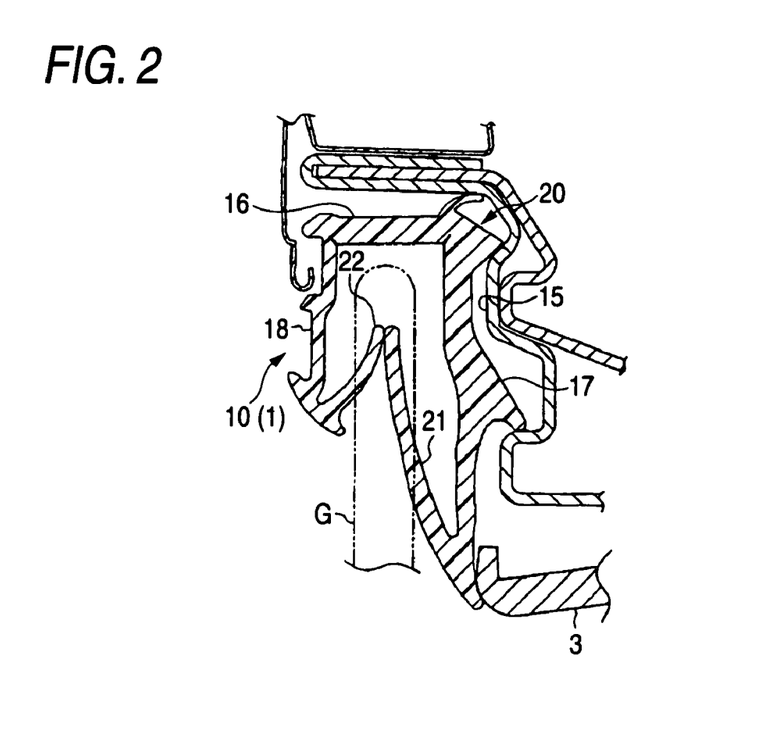
FIG. 2 is a cross-sectional view illustrating a glass run, which is taken on line X-X illustrated in FIG. 1.

More specifically, as illustrated in FIG. 2, the glass run 1 is attached to a sash 15 serving as a mounting portion provided on an inner peripheral side of the door frame 2, as illustrated in FIG. 2. The glass run 1 includes a substantially U-shaped cross-section main body portion 20 having abase portion 16 and a vehicle-interior side wall portion 17 and a vehicle-exterior side wall portion 18, which respectively extend from both sides of the base portion 16, and includes a pair of a vehicle-interior side seal lip 21 and a vehicle-exterior side seal lip 22, which respectively extend to an inner side of the body portion 20 from ends of the vehicle-interior side wall portion 17 and the vehicle-exterior side wall portion 18 and seal a space together with the door glass G.

Figure 3:
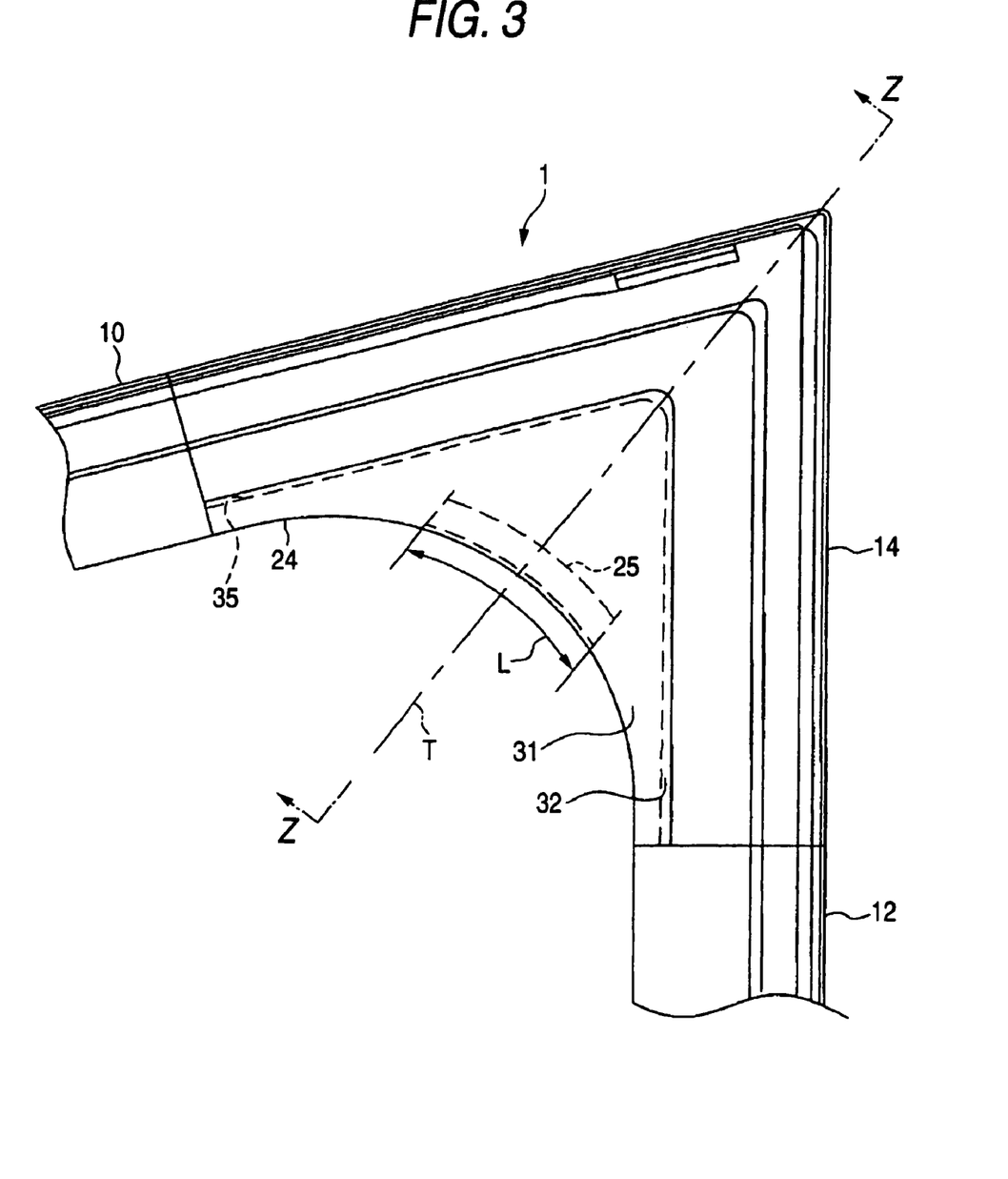
FIG. 3 is a partly enlarged view of the periphery of a corner portion of the glass run.

More particularly, as illustrated in FIGS. 3 and 4, in a peripheral portion of the glass run 1, which corresponds to the rear upper corner portion of the door frame 2, the molded portion 14 includes an extension wall portion 24 extended from an end of the vehicle-interior side wall portion 17 to the inner peripheral side corner portion, and a catching portion 25, which is formed integrally with the inner peripheral side edge portion of the extension wall portion 24 or a vehicle-interior side portion of the vicinity thereof and is caught on the folded portion 7 of the garnish 3.

The catching portion 25 is provided in a predetermined circumferential zone L centered on a bisector T of an angle formed by a corner part of the molded portion 14. According to the present embodiment, the size of the predetermined zone L is set at one-third the circumferential length of the extension wall portion 24.

Further, the extension wall portion 24 has a general part 31 covering a vehicle-exterior side surface of the garnish 3, and a deforming portion 32 provided so as to connect the general part 31 to a boundary portion between the vehicle-interior side wall portion 17 and the vehicle-interior side seal lip 21.

Figure 5:
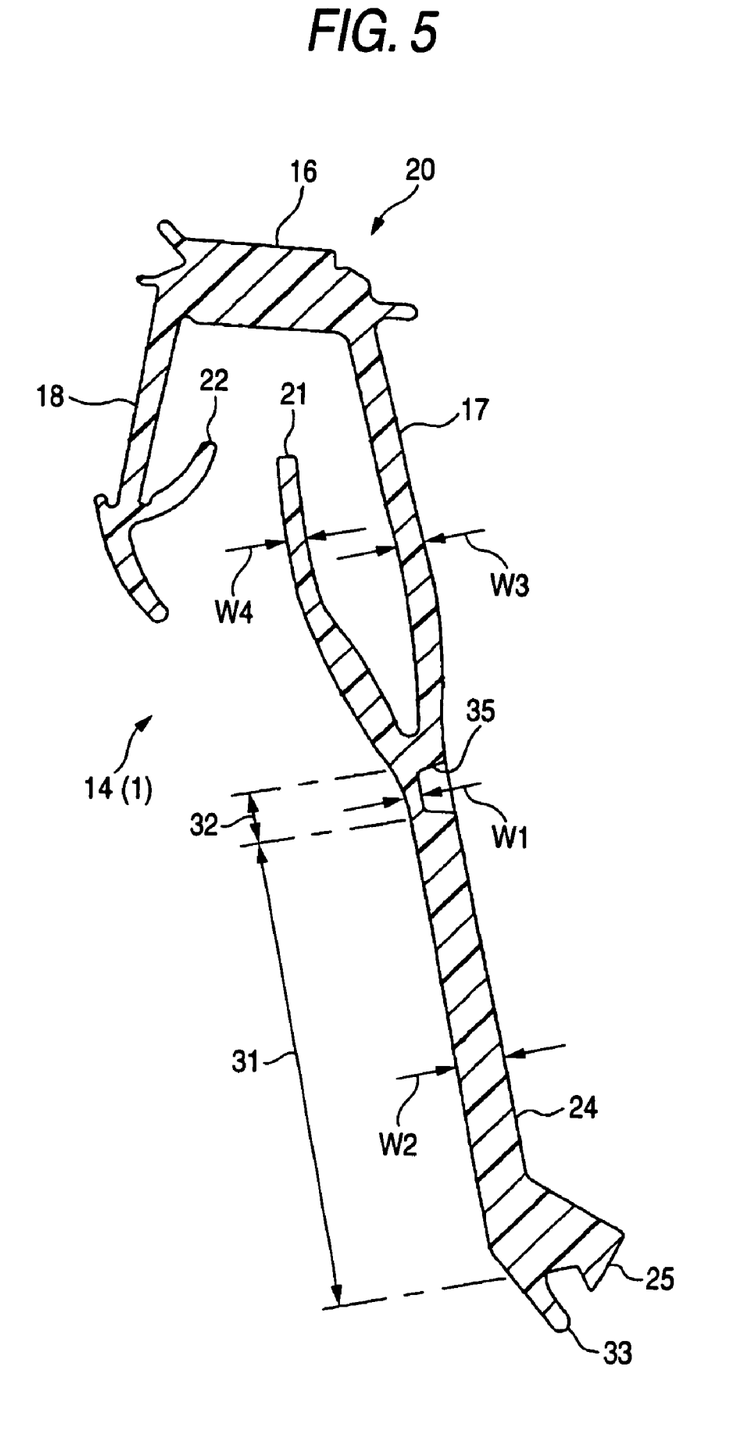
FIG. 5 is a dross-sectional view illustrating the molded part of the glass run in a state before the glass run is attached to the sash, which is take on line Z-Z illustrated in FIG. 3.

The deforming portion 32 is constructed by continuously forming a groove portion 35 in the vehicle-interior side surface part of the extension wall portion 24 along the border between the vehicle-interior side seal lip 21 (main body portion 20) and the extension wall portion 24 over the entire circumferentially entire part of the extension wall portion 24. Accordingly, as illustrated in FIG. 5, the thickness W1 of the deforming portion 32 is set to be thinner than the that W2 of the general part 31. Further, according to the present embodiment, the thickness W1 of the deforming portion 32 is set to be thinner than that W3 of the vehicle-interior side wall portion 17 and that W4 of the vehicle-interior side seal lip 21.

Incidentally, the extension wall portion 24 includes an extension lip 33 extending from an inner peripheral side edge of the general part 31 to an inner peripheral side of the glass run 1. When the catching portion 25 is caught on the folded portion 7 of the garnish 3, a part, at which the catching portion 25 is caught by the garnish 3, is covered with the extension lip 33. Thus, the quality of the appearance is improved. Also, when the catching portion 25 is caught on the folding portion 7 of the garnish 3, the folded portion 7 is sandwiched by the catching portion 25 and the extension lip 33. Consequently, a catching state can be stabilized.

Next, an operation of attaching the glass run 1 to the sash 15 is described hereinbelow. First, the main body 20 is fit into the sash 15. Incidentally, when the molded portion 14 is molded, the molded portion 14 is formed into a developed shape, in which both side walls 17 and 18 of the main body portion 20 are largely opened, as illustrated in FIG. 5. Thus, when the glass run 1 is attached to the sash 15 while both the side wall portions 17 and 18 are narrowed, the extension wall portion 24 is deformed to a vehicle-exterior side, as indicated by chain double-dashed lines illustrated in FIG. 4. Consequently, a gap is formed between the extension wall portion 24 and the garnish 3 (the folded portion 7). Incidentally, according to the present embodiment, the extension wall portion 24 is not deformed completely synchronously with the vehicle-interior side wide wall portion 17 that is deformed to be tilted to the inner side (vehicle-exterior side) of the main body 20. The extension wall portion 24 is totally deformed to the vehicle-exterior side while an angle with respect to the vehicle-interior side wall portion 17 is varied by deforming the deforming portion 32 so as to tilt slightly to the vehicle-interior side.

Subsequently, while the extension wall portion 24 is deformed so as to tilt to the vehicle-interior side at the deforming portion 32, the catching portion 25 is caught by engaging the catching portion 25 with the folded portion 7 of the garnish 3. Consequently, the gap between the extension wall portion 24 and the garnish 3 (folded portion 7) is eliminated to thereby simplify the appearance. Thus, the glass run 1 is attached to the sash 15.

As described above in detail, according to the present embodiment, the extension wall portion 24 has the deforming portion 32 that is thinner than the general part 31. That is, because the deforming portion 32 is thinner than the general part 31, the deforming portion 32 is low in stiffness and is liable to be deformed. Thus, when the glass run 1 is attached to the sash 15, the deforming portion 32 follows the deformation of the main body 20 and positively deforms. Accordingly, a deforming stress of the main body portion 20 can be suppressed from acting in and deforming the inner peripheral side end part of the extension wall portion 24. Consequently, the quality of the appearance can be improved.

In addition, there is no need for thickening the extension wall portion 24 to increase the stiffness thereof in order to suppress the deformation of the inner peripheral side end part thereof. Consequently, occurrence of a situation, in which a sink mark is formed on the design surface of the extension wall portion 24 made of TPO, can be prevented.

Also, due to the presence of the deforming portion 32, the extension wall portion 24 can relatively smoothly be displaced (deformed so as to tilt) to the vehicle-interior side. Moreover, the deformation of the extension wall portion 24, which is caused by the displacement thereof, can be suppressed. Thus, the deforming stress generated in the extension wall portion 24 can be reduced by displacing the extension wall portion 24 to the vehicle-interior side when the catching portion 25 is caught on the folded portion 7 of the garnish 3. Consequently, occurrence of a situation, in which the stress acts in the catching portion 25 in the direction of the vehicle-exterior, can be suppressed. Accordingly, the present embodiment can prevent occurrence of inconvenience that the catching portion 25 is disengaged from the folded portion 7 of the garnish 3.

In addition, the presence of the deforming portion 32 can suppress occurrence of a situation in which when the catching portion 25 is caught on the folded portion 7 of the garnish 3, the stress displacing the extension wall portion 24 to the vehicle-interior side reaches the main body portion 20 and the vehicle-interior side seal lip 21. Consequently, a situation, in which the main body 20 and the vehicle-interior side seal lip 21 in the corner portion (the molded portion 14) are distorted in cross-section, can be avoided. Accordingly, the glass run 1 can easily and stably be attached to the sash. Thus, the glass run can fulfill the functions.

Incidentally, it can be considered that when the glass run 1 is attached to the sash 15, an extension angle of the extension wall portion 24 extending from the vehicle-interior side wall portion 17 is preliminarily set according to the shape of each of the sash 15 and the garnish 3 to prevent the extension wall portion 24 from being floated up. However, in this case, it is necessary to change the design of a circuit every time corresponding to each type of a vehicle. Thus, there is a fear of reduction in productivity. In this regard, the aforementioned inconvenience can be avoided by employing the glass run 1 configured to cause the extension wall portion 24 to smoothly follow the deformation of the main body 20 without deforming the inner peripheral side end part thereof.

Additionally, the groove portion 35 in the extension wall portion 24 is formed on a vehicle-interior side surface facing the garnish 3. Thus, a situation, in which the design is degraded due to the fact that the groove portion 35 is exposed on the appearance, can be avoided. Because the groove portion 35 is formed on the vehicle-interior side surface of the extension wall portion 24, the extension wall portion 24 can be more smoothly displaced to the vehicle-interior side.

In addition, the deforming portion 32 is formed to be thinner than the vehicle-interior side wall portion 17 and the vehicle-interior side seal lip 21. For example, in a case where the stiffness of the extension wall portion 24 is higher than that of the vehicle-interior side wall portion 17, when a force directed to the vehicle-interior side is applied to the extension wall portion 24, the force acts on the vehicle-interior side wall portion 17, instead of the extension wall portion 24. Thus, there is a fear that the vehicle-interior side wall portion 17 bends. On the other hand, according to the present embodiment, the deforming portion 32 is formed to be thinner than the vehicle-interior side wall portion 17 and the vehicle-interior side seal lip 21. Thus, a stress generated at attachment of the glass run 1 to the sash 15 surely acts in the deforming portion 32. Consequently, the present embodiment can surely prevent occurrence of a situation in which such a stress acts in the vehicle-interior side wall portion 17 and the vehicle-interior side seal lip 21, so that the vehicle-interior side wall portion 17 and the vehicle-interior side seal lip 21 are distorted in cross-section. Accordingly, the present embodiment can more reliably obtain advantages in that the glass run 1 can easily and stably be attached to the sash, and that thus, the glass run can fulfill the functions.

Further, the deforming portion 32 is formed at the boundary portion between the extension wall portion 24 and the vehicle-interior side seal lip 21. Thus, both side wall portions 17 and 18 can smoothly be narrowed when the glass run 1 is attached to the sash 15. Accordingly, the extension wall portion 24 is difficult to stretch. Consequently, the present embodiment can prevent occurrence of a situation in which the main body portion 20 (particularly, the vehicle-interior side wall portion 17) and the vehicle-interior side seal lip 21 are distorted in cross-section and in which the attachability of the glass run 1 is reduced. Furthermore, the extension wall portion 24 (the general part 31) can be suppressed from being deformed from the base thereof. Thus, the present embodiment can more effectively fulfill the advantage in that the deformation of the extension wall portion 24 is suppressed.

In addition, the deforming portion 32 is continuously formed over the entire circumferential region 14 of the extension wall portion 24. Thus, the aforementioned advantages can be fulfilled over the entire circumferential region of the extension wall portion 24. Additionally, the deforming portion 32 is formed in a large range in the circumferential direction of the molded portion 24 as one continuous element. Consequently, the deforming portion 32 can more smoothly follow the deformation of the extension wall portion 24. That is, even in a case where when the glass run 1 is attached to the sash 15, the magnitude of the stress acting in the extension portion 24 varies with parts of the extension portion 24, the deforming portion 32 absorbs the stress applied wholly to the extension portion 24 in a wide range. Accordingly, the present embodiment can prevent occurrence of a situation in which only the deforming portion 32 corresponding to a predetermined part of the extension wall portion 24 is extremely largely deformed. Consequently, the quality of the appearance can more surely be improved.

Incidentally, the invention is not limited to the aforementioned embodiment described in the foregoing description thereof. The invention can be implemented, e.g., in the following manners (a) to (f). Apparently, the invention can be applied to cases of application and modification other than examples exemplified below.

(a) Although the glass run 1 is made of a TPO in the aforementioned embodiment, the glass run 1 can be made of another elastic material, such as ethylene propylene diene monomer (EPDM) rubber, having rubber elasticity. Further, although the glass run 1 attached to the front door has been described in particularly detail in the foregoing description of the present embodiment, a glass run attached to a rear door can be similarly constructed.

(b) In the aforementioned embodiment, the deforming portion 32 is formed continuously over the entire circumferential range of the extension wall portion 24. However, the deforming portion 32 can be provided partly in the circumferential direction of the extension wall portion 24. Further, the deforming portion 32 can be formed discontinuously. Incidentally, it is desirable that the deforming portion 32 is provided in the circumferential direction of the extension portion 24 in a range which is as wide as possible. For example, the deforming portion 32 can be provided in a range having a length that is equal to or longer than one-fourth the length in the circumferential direction of the vehicle-interior side seal lip 21 (or the vehicle-interior side wall portion 17) of the molded portion 14.

In addition, although not particularly described in the foregoing description of the embodiment, the inner side surface of the groove portion 35 is not necessarily a smooth surface. For example, processing for forming fine irregularities (e.g., knurling processing) can be performed on the inner side surface of the groove portion 35. Incidentally, a width, at which the groove portion 35 is formed, is not necessarily uniform. The width, at which the groove portion 35 is formed, can vary with parts thereof.

(c) In the aforementioned embodiment, the catching portion 25 is provided in the predetermined circumferential zone L centered on the bisector T of the angle formed by the corner part of the molded portion 14. The position, at which the catching portion 25 is formed, is not limited thereto. For example, the length of the predetermined zone L can be set at one-fourth to half the circumferential length of the extension wall portion 24, instead of one-third the circumferential length thereof. This is because of the facts that in a case where the length of the predetermined zone L is less than one-fourth the circumferential length of the extension wall portion 24, the corner portion cannot sufficiently be prevented from floating up, and that in a case where the length of the predetermined zone L is longer than half the circumferential length of the extension wall portion 24, it is difficult to form the folded portion 7 of the garnish 3. In addition, there is a fear that the catching portion 25 may interfere with another part of the garnish 3 or the door frame 2. Alternatively, the catching portion 25 is provided discontinuously in the circumferential direction of the extension wall portion 24.

(d) Further, the catching portion 25 can be omitted. Even in a case where the catching portion 25 is not provided in the glass run 1, when the glass run 1 is attached to the sash 15, the vehicle-interior side wall portion 17 is deformed by being tilted to an inner side of the main body 20, while the extension wall portion 24 is deformed by being slightly tilted to the vehicle-interior side at the deforming portion 32. Thus, a situation, in which the quality of the appearance is degraded due to the fact that the extension wall portion 24 is largely floated up from the garnish 3 (the folded portion 7) located closer to the vehicle-interior side than the extension wall portion 24, can be suppressed.

(e) In the aforementioned embodiment, the catching portion 25 is formed integrally with the extension wall portion 24. The catching portion according to the invention is not limited thereto. For example, a catching portion can preliminarily be formed of a material, which is harder than the extension wall portion 24, separately from the extension wall portion 24, and can be insert-formed in the extension wall portion 24 when the molded portion 14 is molded.

(f) The shape of the garnish 3 is not limited to that of the garnish of the aforementioned embodiment. For example, the garnish 3 can be shaped by setting an angle formed between the folded portion 7 and the inner wall portion 5 to be an obtuse angle and by setting an angle formed between the outer wall portion 6 and the side wall portion 4 to be a right angle. Further, the folded portion 7 can be provided discontinuously. In this case, it is desirable that the length of a zone, in which the folded portion 7 is formed, is set at a value from one-fourth to half the circumferential length of the extension wall portion 24.

What is claimed is:

1. A glass run mounted on a vehicle door having a door glass, an interior member being mounted, along a vehicle-interior side portion of a door frame, said glass run comprising:

extruded portions formed corresponding to an upper side, front and rear vertical sides of said door frame, and a molded portion molded corresponding to a predetermined corner portion of said door frame, wherein said molded portion comprises:

a substantially U-shaped cross-section main body portion, attached to a mounting portion provided in an inner peripheral side of said door frame, and including a base portion, a vehicle-interior side wall portion, and a vehicle-exterior side wall portion;

a vehicle-interior side seal lip and a vehicle-exterior side seal lip respectively extending from ends of said vehicle-interior side wall portion and said vehicle-exterior side wall portion to an inner side of said main body and sealing a space together with said door glass; and an extension wall portion formed to extend from an end of said vehicle-interior side wall portion to said inner peripheral side of said corner portion and to cover a vehicle-exterior side surface of said interior member, wherein said extension wall portion comprises a deforming portion which has a thickness less than an other part thickness thereof, and wherein said deforming portion comprises a groove portion in said extension wall portion, the thickness of said deforming portion being less than a thickness of said vehicle-interior side wall portion.

2. The glass run according to claim 1, further comprising:
a catching portion formed in a vicinity of an inner peripheral side end part of said extension wall portion to protrude into the vehicle-interior side portion, and to be caught on an end part of a corner portion of said interior member.

3. The glass run according to claim 1, wherein said deforming portion is constructed by forming the groove portion in said extension wall portion along a circumferential direction of said molded portion.

4. The glass run according to claim 3, wherein said groove portion is formed in a vehicle-interior side surface of said extension wall portion, which faces said interior member.

5. The glass run according to claim 1, wherein the thickness of said deforming portion, is less than a thickness of said vehicle-interior side seal lip.

6. The glass run according to claim 1, wherein said deforming portion is formed in one of a boundary portion between said vehicle-interior side seal lip and a part of said extension wall portion, and a vicinity of said boundary portion.

7. The glass run according to claim 1, wherein said deforming portion is continuously formed over an entire circumferential region of said extension wall portion.

8. The glass run according to claim 1, wherein the thickness of said deforming portion is less than the thickness of said vehicle-interior side wall portion as said vehicle-interior side wall portion extends in both sides of the groove.

9. The glass run according to claim 1, wherein the thickness of said vehicle-interior side wall portion decreases as said vehicle-interior side wall portion extends towards a side of the groove, and the thickness of said vehicle-interior side wall portion increases as said vehicle-interior side wall portion extends away from another side of the groove.

10. The glass run according to claim 1, wherein, when the glass run is attached to the mounting portion, the vehicle-interior side wall portion is tilted and deformed to the vehicle-exterior side wall portion of the main body.

11. The glass run according to claim 10, wherein, when the glass run is attached to the mounting portion, said extension wall portion is not deformed synchronously with the vehicle-interior side wall portion, and the extension wall portion is tilted and deformed, while an angle with respect to the vehicle-interior side wall portion is varied by deforming the deforming portion.

* * * * *